United States Patent Office 3,657,388
Patented Apr. 18, 1972

3,657,388
PROCESS FOR THE CONDENSATION IN THE SOLID STATE OF CONDENSATION POLYMERS OR THE INITIAL PRODUCTS THEREOF
Peter Schweizer, Konigsbrunn, and Hans Thaler, Strassberg, Germany, assignors to Farbwerke Hoechst Aktiengesellschaft vormals Meister Lucius & Bruning, Frankfurt am Main, Germany
No Drawing. Filed Apr. 16, 1970, Ser. No. 29,284
Claims priority, application Germany, Apr. 26, 1969, P 19 21 447.2
Int. Cl. C08g *17/003, 39/10*
U.S. Cl. 260—873
5 Claims

ABSTRACT OF THE DISCLOSURE

Linear condensation polymers of high molecular weight, for example, polyesters or polyamides, or the initial products thereof are condensed in the solid state in the form of pressed objects obtained from the powdery or very fine-grained materials having a particle diameter of up to 2 millimeters. The condensation in the solid state is carried out under reduced pressure or in an inert gas atmosphere. The process is applicable, for example, to polyethylene terephthalate, Nylon 6 and Nylon 66.

---

The present invention relates to a process for the condensation in the solid state of condensation polymers or the initial products thereof.

It has been proposed to polycondense low molecular weight polyesters and polyamides or the mixtures thereof in the solid phase to obtain products of very high molecular weights. As compared with the condensation in the melt, the condensation in the solid state has the advantage of using milder reaction conditions thus enabling considerably higher molecular weights together with a very low content of free terminal groups to be obtained. The condensation in the solid state is therefore growing steadily in technical importance, for example, for the manufacture of raw materials for high-strength technical filaments or highly impact-resistant injection moulded articles of linear condensation polymers, for example, polyethylene terephthalate or nylon 66.

The condensation in the solid state is generally carried out such that the precondensation products obtained by polycondensation in the melt are condensed in as finely divided a form as possible, preferably in the form of dust, at temperatures below their melting point in vacuo or in a stream of inert gas until the desired molecular weight has been obtained. To obtain an adequate speed of condensation, temperatures only little below the melting point of the polymer, i.e. at most 30 to 40° C. below the melting point, must be used. Under these conditions the fine-grained particles of the polycondensation products have, however, a pronounced tendency to fritting and lump formation which is the greater the smaller the particle diameters. As the speed of condensation also rises with decreasing particle diameter, attempts have been made to prevent the very fine-grained or dust-like polycondensation products from being sintered together in the condensation in the solid state in the temperature range that is most favorable for the speed of condensation, i.e. little below the melting point of the material. For this purpose it has been proposed to use special apparatus provided with, for example, special stirring means or to work in a fluidized bed. In the latter case the inert gas (air being inappropriate) is advantageously recycled to reduce costs, which requires additional complicated apparatus.

All these measures, however, fail to completely remove the above difficulties encountered in the condensation in the solid state of fine-grained or dustlike products, particularly in a continuous process. Products granulated from the melt of coarser grain size have therefore to be used in practice and correspondingly less favorable polymer properties have to be taken into the bargain.

The present invention provides a process for polycondensing linear condensation polymers of high molecular weight or the initial products thereof in the solid phase at temperatures below the melting point of the starting product under reduced pressure or in an inert gas atmosphere to obtain products of higher molecular weights, which comprises subjecting the condensation polymers or the initial products thereof in the form of pressed objects of powdery or very fine-grained material which has a particle diameter of up to 2 millimeters to a condensation in the solid state.

As linear condensation polymers of high molecular weight there may be used linear polyesters, for example those in which the acid component consists of at least one radical of the following polycarboxylic acids; terephthalic, isophthalic, 4,4'-diphenyl-dicarboxylic, 2,5-dimethyl-terephthalic, 5-sulfoisophthalic acid, bis-(p-carboxyphenoxy)-ethane, naphthalenedicarboxylic acid-(1,3), -(1,4), -(1,5) or -(2,6), hexahydroterephthalic, cyclobutanedicarboxylic, adipic, suberic, sebacic, decanedicarboxylic, sulfonyl-4,4-dibenzoic acid, and of which the diol component consists of, for example, at least one radical of the following polyfunctional alcohols: ethylene glycol, propanediol-(1,2), butanediol-(1,4), 2,2-dimethylpropanediol-(1,3), cyclobutanediol-(1,2), cyclobutanediol-(1,3), 1,4-dimethylolcyclohexane, 1,3- or 1,4-xylylene glycol, bis-(4,4'-hydroxyphenyl)-dimethylmethane, 1,3- or 1,4-bis-hydroxyethoxybenzene, and preferably polyesters of which the monomer units consist to the extent of at least 90 mol percent, calculated on the polymer, of radicals of terephthalic acid and of ethylene glycol. As initial products of linear condensation polymers there may be used, for example, ε-aminocaproic acid, ε-caprolactam, polycaprolactam of a molecular weight of, for example, 1000, hexamethylene adipamide, hexamethylene sebacamide, ω-aminoenanthic acid, piperazine adipate, the octa-, nona- or deca-methylenediamine salts of cis-hexahydroterephthalic acid, cis-(β-aminocyclohexyl)-propionic acid, cis-γ-(3-aminocyclohexyl)-butyric acid, β-[p-(β-aminoethyl)-phenyl]-propionic acid, ω-aminopelargonic acid, ω-aminoundecanoic acid, hexamethylene-diamine salts of ω,ω'-thiodivaleric acid and of terephthalic acid.

Of the linear condensation polymers polyethylene terephthalate, poly-ε-amino-caprolactam and polyhexamethylene adipamide are preferably used. Preferred initial products are 6-aminocaproic acid, ε-caprolactam, low molecular weight polycaprolactam and hexamethylene adipamide. These polycondensation products or their initial products can readily be converted to products of higher molecular weight by the process of the invention. The speed of condensation is not quite so high as when using the unpressed very fine-grained raw materials, but is sufficient. The pressed objects, like products granulated from the melt of coarser grain size, are, however, much easier to handle than powdery products. Condensation is carried out in the solid state at temperatures below the melting point, preferably 30 to 40° C. below the melting point of the starting material, under as highly reduced a pressure as possible, advantageously under a pressure of less than 5 millimeters of mercury, preferably less than 2 millimeters of mercury, or in an inert gas stream. The fine-grained substances used for the pressed objects have a particle diameter of up to 2 millimeters, preferably up to 1.5 millimeters. The pressed objects may also be made of a fine-grained mixture of chemically or structurally different condensation polymers or of the initial products of such chemically or structurally different condensation polymers. They often contain solid or liquid, chemically inert or reactive additives originating from the pressing process or such additives may be added after the manufacture of the pressed objects but before the condensation in the solid state. Individual forms of carrying out the process of the invention consist in that the pressed objects are subjected to the condensation in the solid state in the form of a plurality of individual structures or in the form of endless, optionally textured strips, bands or webs, or in that only a pressed, optionally textured band or web is treated in accordance with the invention.

When using pressed objects in accordance with the process of the invention the speed of condensation is not quite so high as when using the unpressed very fine-grained raw materials, but is sufficient for technical applications. Like products granulated from the melt of coarser grain size, the pressed objects are much easier to handle than powdery products and are advantageous already from this viewpoint. The process of the invention is superior to processes using products of the same size granulated from the melt.

As compared with powdery or very fine-grained products, the pressed objects enable a considerably higher throughput per unit time because there is no danger of fritting or bridging even when using thicker layers.

The fine-grained consistency of the products to be pressed is advantageously obtained by grinding. This enables also waste materials of any desired shape to be used and processed to products of high quality by the process of the invention.

The process of the invention is carried out such that the dustlike or fine-grained precondensation products or the initial products thereof are made into pressed objects, optionally after the addition of additives such as, for example, brightening agents, pigments and stabilizers. The pressing process is advantageously carried out with the help of, for example, gear wheel granulating machines which permit the use of different moulding tools varying with the size and shape of the pressed objects and which may be cooled or heated as desired. Pressing is advantageously carried through under the minimum pressure and the minimum temperature at which pressed objects of such a good bond and smooth surface are obtained that no disturbing abrasion takes place in subsequent working processes. The conditions of the pressing process vary with the starting material. If the particles are packed too closely in the pressed object or even fused together during pressing, the activity of the pressed objects in the condensation in the solid state is impaired. To obtain as short a condensation time as possible, the size and shape of the pressed objects should be such that as large a surface area as possible together with a small thickness are obtained. The pressed objects advantageously have the shape of cushions having an edge length of 10 millimeters and a maximum thickness of 3 to 4 millimeters. Smaller pressed objects are in part less easy to handle; with larger ones the speed of condensation is lower.

The pressed objects are subjected in known apparatus, optionally after drying, to the conditions normally used for condensations in the solid state, that is a temperature advantageously not lower than 30 to 40° C. below the melting point of the precondensation product or, in the case of mixtures, not lower than 30 to 40° C. below the melting point of the precondensation product that constitutes the largest proportion in the mixture, and as low a pressure as possible ranging from only a few millimeters of mercury to as highly reduced a pressure as possible or a stream of an inert gas, for example, nitrogen, carbon dioxide or helium, which may be recycled via appropriate purifying apparatus. The condensation time depends on the desired molecular weight and varies for one and the same starting material with the reaction conditions, the apparatus used, and the shape and density of packing of the pressed objects. Of pressed objects of the same size, those of finer material, e.g. grain sizes below 0.8 milli-meter, generally condense more rapidly than those of coarser material, e.g. grain sizes of 0.8 to 1.5 millimeters.

Before pressing, a great many different liquid or solid substances may be added to the fine-grained precondensation products or their initial products. These substances may be, for example, readily volatile, chemically inert substances, for example paraffin, which evaporate under the conditions of the condensation in the solid state, thus imparting to the pressed object a structure with a plurality of small pores, or they may be non-volatile, chemically inert fillers, for example, colouring pigments or nucleating agents. By making appropriate additions before pressing, copolymers or chemical modifications may be formed during the condensation in the solid state. Stabilizers against degradation by light, heat or oxygen, condensation accelerators, substances having an affinity for dyes, brightening agents and anti-static agents which are intended to act at once, in a subsequent processing or refining process or when the product is in use, can be added to the precondensation products or the initial products thereof in a simple manner before pressing. This is a further essential advantage of the process in accordnace with the invention as compared with the known method of using precondensation products which are powdery or have been granulated from the melt.

The process of the invention may be carried out with advantage in a continuous manner. For this purpose, the pressed objects may have the shape of a continuous band having, for example, a honeycomb-like texture, in which case the cushions described above are connected with one another at the edges. This pressed band is advantageous for being passed continuously through a heated canal to be after-condensed.

The range of molecular weight of the products to be treated by the process of the invention has no numerical limits. Although some pressed objects made of a precondensation product of an average molecular weight of less than 10,000 are to a certain extent brittle, which may give rise to a relatively pronounced abrasion in the working-up, it is advantageous to apply the process of the invention. With rising molecular weight of the precondensation products, the impact strength of the pressed objects increases and abrasion decreases. With the same initial values, the obtainable final values of molecular weight depend on the reaction conditions, the apparatus, the chemical nature of the condensation product, the density of packing of the particles in the pressed object and the ratio of surface area to volume of the pressed object. The smaller the density of packing of the particles and the larger the surface area of the pressed object, the higher is the obtainable molecular weight. When the latter is expressed by the relative viscosity of the end products, obtainable final values of 2.6 are not seldom found in linear condensation polymers, for example polyethylene terephthalate. The relative viscosity was measured at 25° C. in a 1% by weight solution of polyethylene terephthalate in a 3:2 mixture of phenol and tetrachlorethane.

The process of the invention is applicable to all condensations, independently of the chemical nature of the compressed material. The process is of particular importance in industry for the condensation in the solid state of precondensation products of linear polyesters, for example polyethylene terephthalate, and linear polyamides, for example Nylon 6 and Nylon 66, or mixtures of these compounds. It is also applicable to condensation polymers of different nature or their initial products.

The following examples serve to illustrate the invention.

EXAMPLES

Polyethylene terephthalate obtained by melt condensation and having a relative viscosity of 1.5 was subjected to a condensation in the solid state in the form of chips, as ground product and in the form of cushion-shaped pressed objects. The changes in viscosity and in the content of terminal carboxyl groups were examined.

As starting material a cubic product granulated from the melt and having an edge length of 4 x 4 x 2 millimeters was used. By grinding and fractional sifting there were obtained ground material (I) which was substantially dustlike and had a maximum particle diameter of 0.8 millimeter and ground material (II) which was fine-grained and had a particle diameter within the range of from 0.8 to 1.5 millimeters. From ground material (I) and ground material (II) cushion-shaped pressed objects with an edge length of 10 millimeters and a diameter of 3 to 4 millimeters in the thickest place were made on a gear-wheel granulating machine. The pressed objects had smooth surfaces and a high impact strength. No appreciable abrasion occurred on transport and during working-up.

(1) In each case 150 grams polyethylene terephthalate were dried at 180° C. (oil bath) under a nitrogen stream of 50 liters per hour in a 1-liter flask of a rotary evaporator of the type Rotavapor. The temperature of the bath was then raised to 235° C. and the material was condensed under a nitrogen stream of 50 liters per hour. A condensation time of 6 hours was used. Every two hours a test sample was taken to measure the relative viscosity and the content of terminal carboxyl groups. The results ascertained are indicated in Table 1.

(2) In the apparatus described in Example 1, 150 grams polyethylene terephthalate were dried in each case at 180° C. for 1 hour under a nitrogen stream of 50 liters per hour. The temperature of the bath was then increased to 235° C. and the material was condensed for 6 hours under a pressure of 1.5 millimeters of mercury (regulated with nitrogen). Test samples were taken as in Example 1. The results obtained are indicated in Table 2.

It is evident from the tables that in the condensations in the solid state in vacuo and in a nitrogen stream, respectively, the speed of condensation of the pressed objects (10 x 10 x 3 millimeters) was considerably superior to that of the usual products granulated from the melt (4 x 4 x 2 millimeters), although the surface area of the pressed objects was only about 5 times larger per particle while the volume was about 10 times larger. The speed of condensation of the corresponding ground polyesters was not reached but the pressed objects showed no signs of fritting and baking together on heating, contrary to the ground polyesters.

TABLE 1
Condensation in the solid state of polyethylene terephthalate under a pressure of 700 millimeters of mercury in a nitrogen stream

| Condensation time in hours | Product granulated from the melt (chips 4x4x2mm.) | | Ground material (I) (particle diameter <0.8 mm.) | | Ground material (II) (particle diameter 0.8–1.5 mm.) | | Pressed objects of (I) (cushion-shaped objects 10x10x3mm.) | | Pressed objects of (II) (cushion-shaped objects 10 x 10 x 3 mm.) | |
|---|---|---|---|---|---|---|---|---|---|---|
| | Relative viscosity | Terminal carboxyl groups mval./kg. | Relative viscosity | Terminal carboxyl groups mval./kg. | Relative viscosity | Terminal carboxyl groups mval./kg. | Relative viscosity | Terminal carboxyl groups mval./kg. | Relative viscosity | Terminal carboxyl groups mval./kg. |
| 0 | 1.51 | 17.4 | 1.5 | 16.8 | 1.51 | 17.9 | 1.51 | 16.9 | 1.5 | 17.4 |
| 2 | 1.64 | 16.4 | 1.9 | 8.5 | 1.79 | 12.4 | 1.67 | 12.7 | 1.72 | 13.2 |
| 4 | 1.73 | 16.8 | 2.13 | 8.0 | 1.89 | 7.2 | 1.83 | 11.4 | 1.81 | 11.2 |
| 6 | 1.74 | 9.2 | 2.29 | 8.5 | 2.03 | 8.6 | 1.96 | 8.8 | 1.89 | 11.8 |

TABLE 2
Condensation in the solid state of polyethyleneterephthalate in vacuo (under a pressure of 1.5 millimeters of mercury)

| Condensation time in hours | Product granulated from the melt (chips 4x4x2mm.) | | Ground material (I) (particle diameter <0.8 mm.) | | Ground material (II) (particle diameter 0.8–1.5 mm.) | | Pressed objects of (I) (cushion-shaped objects 10x10x3mm.) | | Pressed objects of (II) (cushion-shaped objects 10 x 10 x 3 mm.) | |
|---|---|---|---|---|---|---|---|---|---|---|
| | Relative viscosity | Terminal carboxyl groups mval./kg. | Relative viscosity | Terminal carboxyl groups mval./kg. | Relative viscosity | Terminal carboxyl groups mval./kg. | Relative viscosity | Terminal carboxyl groups mval./kg. | Relative viscosity | Terminal carboxyl groups mval./kg. |
| | 1.51 | 17.4 | 1.5 | 16.8 | 1.51 | 17.9 | 1.51 | 16.9 | 1.50 | 17.4 |
| | 1.65 | 14.5 | 2.19 | 13.1 | 1.86 | 10.3 | 1.91 | 13.7 | 1.86 | 12.8 |
| | 1.68 | 11.5 | 2.53 | 12.8 | 2.07 | 9.6 | 2.09 | 12.3 | 1.99 | 13.2 |
| | 1.73 | 12.1 | 2.73 | 14.9 | 2.18 | 12.9 | 2.20 | 13.6 | 2.04 | 7.9 |

What is claimed is:

1. In a process for polycondensing linear condensation polymers of high molecular weight linear polyesters or the initial products thereof in the solid phase at temperatures below the melting point of the said polymers under reduced pressure or in an inert gas atmosphere to obtain products of higher molecular weight, the improvement which comprises subjecting the said polymers in the form of pressed objects of powdery or very fine-grained material which has a particle diameter of at most 2 millimeters to a condensation in the solid state.

2. The process of claim 1 wherein the pressed objects consist of a mixture of chemically or structurally different condensation polymers or of the initial products of such chemically or structurally different condensation polymers.

3. The process of claim 1 wherein the pressed objects contain solid or liquid, chemically inert or reactive additives originating from the pressing process and/or are subjected to the condensation in the solid state in combination with such additives.

4. The process of claim 1 wherein the pressed objects are subjected to the condensation in the solid state in the form of a plurality of individual geometric structures or in the form of endless, optionally textured strips, bands or webs, or only a pressed, optionally textured band or web is subjected to the condensation in the solid state.

5. The process of claim 1 wherein the condensation polymer is polyethylene terephthalate.

References Cited
UNITED STATES PATENTS 3,544,523  12/1970  Maxion.

MELVIN GOLDSTEIN, Primary Examiner

U.S. Cl. X.R.

260—75 M, 78 SC